United States Patent [19]

Schiessl

[11] Patent Number: 5,171,833
[45] Date of Patent: Dec. 15, 1992

[54] PROCESS FOR MINIMIZING RESIDUAL FREE HYDRAZINE IN POLYMER LATICES

[75] Inventor: Henry W. Schiessl, Northford, Conn.

[73] Assignee: Olin Corporation, Cheshire, Conn.

[21] Appl. No.: 664,146

[22] Filed: Mar. 4, 1991

Related U.S. Application Data

[63] Continuation-in-part of Ser. No. 352,782, May 16, 1989, Pat. No. 5,068,313.

[51] Int. Cl.$^5$ ............................. C08F 6/10; C08F 6/16
[52] U.S. Cl. .................................... 528/486; 528/487; 528/492; 528/493; 528/494
[58] Field of Search ................ 528/486, 487, 492, 493, 528/494

[56] References Cited

U.S. PATENT DOCUMENTS

| | | | |
|---|---|---|---|
| 4,452,950 | 6/1984 | Wideman | 525/339 |
| 4,532,318 | 7/1985 | Abubakari et al. | 528/483 |
| 4,954,614 | 9/1990 | Schiessl et al. | 528/483 |
| 5,068,313 | 11/1991 | Schiessl | 528/486 |

*Primary Examiner*—Paul R. Michl
*Assistant Examiner*—Andrew E. C. Merriam
*Attorney, Agent, or Firm*—Dale Lynn Carlson

[57] ABSTRACT

This invention relates to a process for minimizing or reducing the amount of residual free hydrazine in polymer latices. The process is particularly useful in the manufacture of hydrogenated nitrile rubber which is resistant to oxidative degradation at high temperatures, as well as resistant to corrosive environments such as acid environments. Nitrile rubbers are useful in the manufacture of fan belts, seals, gaskets, and hoses in increasingly small and hot-running car engines.

2 Claims, No Drawings

PROCESS FOR MINIMIZING RESIDUAL FREE HYDRAZINE IN POLYMER LATICES

This application is a continuation-in-part of U.S. application Ser. No. 07/352,782 filed on May 16, 1989, now U.S. Pat. No. 5,068,313.

BACKGROUND OF THE INVENTION

Various forms of hydrogenated nitrile rubbers have recently been introduced into the marketplace. Hydrogenated nitrile rubber has the advantage of being resistant to oxidative degradation at high temperature, as well as being resistant to corrosive environments such as acid environments. These materials have found utility in the manufacture of fan belts, seals, gaskets, and hoses in increasingly small and hot-running car engines.

One process for the production of hydrogenated polymers in latex form, particularly hydrogenated latex rubber, utilizes hydrazine and an unsaturated polymer as the starting materials. This process is more particularly described in U.S. Pat. No. 4,452,950, assigned to the Goodyear Tire and Rubber Company. However, the product produced in accordance with the process described in the '950 patent suffers from the disadvantage of containing residual unreacted hydrazine. This residual hydrazine is considered undesirable from an environmental and/or toxicity standpoint.

In view of the above, it would be highly desirable to provide a process for the elimination and/or reduction of the residual hydrazine in the hydrogenated polymer product mixture.

In one aspect, the present invention relates to a process for reducing or eliminating free hydrazine from a mixture of hydrazine and hydrogenated polymer, wherein said polymer is in latex form, which comprises contacting said free hydrazine in said mixture with a hydrazine scavenger in order to bind said free hydrazine, thereby reducing or eliminating the presence of free hydrazine in said latex.

In another aspect, the present invention relates to a two-step process for reducing or eliminating hydrazine from a mixture of hydrazine and hydrogenated polymer, said polymer being in latex form, which comprises:

(a) contacting said hydrazine in said mixture with a peroxide at a temperature of between about 30° C. and about 60° C., preferably between about 40° C. and about 50° C., in the presence of a metal ion initiator, in order to effect a reaction of said hydrazine with said peroxide in order to produce a purified mixture containing a reduced amount of hydrazine, and (b) contacting said free hydrazine in said purified mixture with a hydrazine scavenger in order to bind at least a portion of said free hydrazine, thereby providing a desired mixture containing a reduced amount of free hydrazine.

These and other aspects of the present invention will become apparent upon a reading of the following detailed description of the invention.

The polymer/hydrazine mixture generally contains a major amount (i.e. typically greater than 70 weight percent) of water, saturated polymer (typically about 5 to about 25 weight percent), a minor amount of unsaturated polymer (typically between about one and five weight percent), and a minor amount (typically between about 0.1 and about 3 weight percent) of hydrazine, wherein the weight percents are based upon the total weight of the latex. For most applications, it is preferred that the amount of unsaturated polymer in the latex and the amount of hydrazine be minimized in the mixture. Reduction or elimination of the unsaturated polymer by conversion to saturated polymer is helpful in reducing the reactivity of the polymer latex. Reduction or elimination of the hydrazine in the mixture provides a mixture having reduced toxicity. The process of the present invention provides multiple advantages by both (a) reducing the amount of hydrazine in the mixture and (b) converting at least some of the unsaturated polymer to saturated polymer.

The hydrazine scavenger useful in the processes of the present invention acts to bind at least some portion of the free hydrazine in the purified latex. Useful hydrazine scavengers are compounds that react with hydrazine and include the following classes of compounds: isocyanates (such as tolylene diisocyanate, phenyl isocyanate and methylene dipenyl isocyanate (MCI)); alkylene oxides (such as ethylene oxide, propylene oxide, isobutylene oxide, styrene oxide, and polymeric epoxides); acrylates and methacrylates (such as methyl methacrylate); acrylonitrile, acrylic acids and methacrylic acids; ketones and diketones (such as acetyl acetone); aldehydes (such as benzaldehyde); and combinations thereof. The preferred hydrazine scavenger is propylene oxide.

The hydrazine scavenger is employed in a "scavenging effective amount". As used herein, the term "scavenging effective amount" designates an amount of hydrazine scavenger sufficient to react with and bind at least some amount of the free hydrazine in the latex mixture. Preferably, the hydrazine scavenger is employed in an amount of between about 1 and about 10, more preferably between about 1 and about 5 times the theoretical molar amount required to react with the free hydrazine present in the hydrazine/latex mixture.

In a preferred embodiment of the two-step process of the present invention, step (a) of the two-step process is utilized to reduce the amount of hydrazine in the polymer/hydrazine mixture to a level of about 200 ppm or less, and then step (b) is employed to reduce the amount of free hydrazine in the mixture to 25 ppm or less.

The polymer/hydrazine mixture in latex form is prepared by hydrogenation of unsaturated polymers. Prior to hydrogenation, the unsaturated polymers are typically composed of 5 to 100 percent by weight of a conjugated diene monomer unit and 95 to 0 percent by weight of an ethylenically-unsaturated monomer unit. Specific examples of the conjugated diene monomer are 1,3-butadiene, 2,3-dimethylbutadiene, isoprene, and 1,3-pentadiene, specific examples of the ethylenically unsaturated monomer include unsaturated nitriles such as acrylonitrile and methacrylonitrile, monovinyl aromatic hydrocarbons such as styrene, (o-, m-, and p-) alkylstyrenes, divinyl aromatic such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/- butadiene (random or blocked) copolymer, a butadiene/isoprene copolymer, and an isoprene/isobutylene copolymer.

Suitable peroxides include organic peroxides, inorganic peroxides, and combinations thereof, such as, for example, hydrogen peroxide, alkali metal peroxides such as sodium peroxide and potassium peroxide, peracetic acid, benzoyl peroxide, alkali metal persulfates, and the like. Preferred peroxides are hydrogen peroxide and sodium peroxide, most preferably hydrogen peroxide. The peroxide is preferably employed in the presence of a metal ion initiator, such as copper sulfate or ferrous sulfate. The reaction time for the process of the present invention can vary over a wide range, but is preferably between about 1 hour and about 50 hours, more preferably between about 1 hour and about 25 hours, most preferably between about 1 hour and about 20 hours.

The following examples are intended to illustrate, but in no way limit the scope of, the present invention.

EXAMPLE 1

(Proposed Example)

An acrylonitrile/butadiene rubber with 66.2 weight percent butadiene and an average molecular weight of about 200,000 was hydrogenated in latex form with a mixture of hydrazine and hydrogen peroxide in a manner approximately as described in U.S. Pat. No. 4,452,950, without a metal ion initiator. After achieving about 91 percent conversion of the C=C double bonds, the latex contained 3.76 weight percent unreacted hydrazine based on the weight of the aqueous phase of the latex. Addition of hydrogen peroxide was continued until the hydrazine level had been reduced to about 100 ppm. Addition of propylene oxide serves to reduce the residual free hydrazine to a vanishingly small amount.

Another test is conducted in an analogous manner, but using a copper sulfate initiator, followed by PO addition. Free hydrazine is reduced to a trace amount.

EXAMPLE 2

An acrylonitrile/butadiene rubber with 66.2 weight percent butadiene and an average molecular weight of about 200,000 was hydrogenated in latex form with a mixture of hydrazine and hydrogen peroxide in a manner approximately as described in U.S. Pat. No. 4,452,950, without a metal ion initiator. After achieving about 91 percent conversion of the C=C double bonds, the latex contained 3.76 weight percent unreacted hydrazine, based on the weight of the aqueous phase of the latex. This latex was placed in a pressure vessel, along with ca 0.2 weight percent hydroquinone as catalyst, the vessel flushed with pure oxygen several times and then pressured with pure oxygen to about 40 psig and allowed to react at the autogenous temperature, which generally was between 20° and 40° C. This operation of flushing and filling the pressure reactor was repeated several times in order to provide sufficient oxygen for the reaction with hydrazine. The final hydrazine concentration after this oxygen treatment was about 100 ppm, based on the total weight of latex. The total time of treatment was about 20 hours under pressure.

To a portion of the above latex, a molar excess of toluene diisocyanate (TDI) (relative to the hydrazine present) was added at room temperature and stirred for two hours. The final free hydrazine content was about 50 ppm, based on the total weight of the latex.

EXAMPLE 3

To another portion of the hydrogenated latex as prepared in Example 2, an excess of propylene oxide was added at room temperature and stirred for two hours. Again the final free hydrazine content was about 50 ppm, based on the total weight of the latex.

EXAMPLE 4

An acrylonitrile/butadiene rubber with 66.2 weight percent butadiene and an average molecular weight of about 200,000 was hydrogenated in latex form with a mixture of hydrazine and hydrogen peroxide in a manner approximately as described in U.S. Pat. No. 4,452,950, without a metal ion initiator. After achieving about 88 percent conversion of the C=C double bonds, the run was interrupted. At this point in the reaction, the latex contained 4.05 weight percent unreacted hydrazine, based on the weight of the aqueous phase of the latex.

To a portion of this hydrogenated latex was added an excess of methyl acrylate and stirred at room temperature for 1.5 hours. During this period, there was a noticeable exotherm. The final hydrazine content was about 470 ppm, based on the weight of the aqueous phase of the latex, which represents about a 99 percent removal of hydrazine from the latex.

What is claimed is:

1. A two-step process for reducing or eliminating hydrazine from a mixture of hydrazine and polymer, said polymer being in latex form, characterized by:
   (a) contacting said hydrazine in said mixture with a peroxide at a temperature of between about 40° C. and about 50° C., in the presence of a metal ion initiator selected from the group consisting of copper sulfate, ferrous sulfate, and combinations thereof, in order to effect a reaction of said hydrazine with said peroxide, using a reaction time of between about 1 hour and about 5 hours, in order to produce a purified mixture containing a reduced amount of hydrazine, and
   (b) contacting said free hydrazine in said purified mixture with a hydrazine scavenger selected from the group consisting of isocyanates, alkylene oxides, acrylates, methacrylates, acrylic acids, acrylonitrile, methacrylic acids, ketones, diketones, aldehydes, and combinations thereof, in a scavenging effective amount of between 1 and 10 times the number of moles of hydrazine present in said purified mixture in order to bind at least a portion of said free hydrazine, thereby providing a desired mixture containing a reduced amount of free hydrazine therein.

2. The process of claim 1 characterized in that the hydrazine scavenger is propylene oxide.

* * * * *